United States Patent
Park et al.

(10) Patent No.: US 7,899,112 B1
(45) Date of Patent: Mar. 1, 2011

(54) METHOD AND APPARATUS FOR EXTRACTING CHROMINANCE SHAPE INFORMATION FOR INTERLACED SCAN TYPE IMAGE

(75) Inventors: Cheol Soo Park, Seoul (KR); Joo Hee Moon, Seoul (KR); Hae Kwang Kim, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 0 days.

(21) Appl. No.: 09/261,246

(22) Filed: Mar. 3, 1999

(30) Foreign Application Priority Data

Mar. 5, 1998 (KR) .................................. 98-7374
Feb. 10, 1999 (KR) .................................. 99-4674

(51) Int. Cl.
*H04N 7/12* (2006.01)
(52) U.S. Cl. .................................. 375/240.01; 375/240
(58) Field of Classification Search .................. 375/240, 375/240.13, 240.16, 240.01, 240.12, 240.23, 375/240.24; 382/236, 239, 300, 166, 243; 345/420, 629; 348/663
See application file for complete search history.

(56) References Cited

U.S. PATENT DOCUMENTS

| | | | | |
|---|---|---|---|---|
| 5,347,308 A | * | 9/1994 | Wai | 375/240.23 |
| 5,500,686 A | * | 3/1996 | Yamaguchi et al. | 348/663 |
| 5,822,460 A | * | 10/1998 | Kim | 382/243 |
| 5,973,743 A | * | 10/1999 | Han | 375/240.13 |
| 5,974,172 A | * | 10/1999 | Chen | 382/166 |
| 6,002,812 A | * | 12/1999 | Cho et al. | 382/300 |
| 6,005,980 A | * | 12/1999 | Eifrig et al. | 382/236 |
| 6,057,884 A | * | 5/2000 | Chen et al. | 375/240.16 |
| 6,069,976 A | * | 5/2000 | Kim | 382/239 |
| 6,137,837 A | * | 10/2000 | Nemiroff et al. | 375/240.16 |
| 6,154,491 A | * | 11/2000 | Uetani | 375/240.16 |
| 6,208,693 B1 | * | 3/2001 | Chen et al. | 375/240.24 |
| 6,407,735 B2 | * | 6/2002 | Kressin | 345/420 |
| 6,532,022 B1 | * | 3/2003 | Ahmad | 345/629 |

* cited by examiner

*Primary Examiner*—Allen Wong
(74) *Attorney, Agent, or Firm*—H.C. Park & Associates, PLC

(57) ABSTRACT

A method and apparatus for extracting chrominance shape information for an interlaced scan type image, which are used in a video compression coding/decoding system or a video manipulation equipment/system. According to the present invention, in an interlaced scan type image with arbitrary luminance shape information, chrominance shape information is extracted on the basis of four adjacent luminance shape pixels in two lines of the same type field. The present method and apparatus can solve a color bleeding problem in a conventional chrominance shape information extraction method considering no characteristic of the interlaced scan type image. Therefore, the present invention has the effect of significantly improving subjective picture quality.

12 Claims, 13 Drawing Sheets

Legend (Fig. 4 to Fig. 8)

PRIOR ART

METHOD AND APPARATUS FOR EXTRACTING CHROMINANCE SHAPE INFORMATION FOR INTERLACED SCAN TYPE IMAGE

BACKGROUND OF THE INVENTION

1. Field of the Invention

The present invention relates in general to the extraction of chrominance shape information for an interlaced scan type image, and more particularly to a method and apparatus for extracting the chrominance shape information for the interlaced scan type image, in which chrominance and luminance signals are matched with each other in consideration of a characteristic of the interlaced scan type image, thereby overcoming a color bleeding phenomenon to enhance a subjective picture quality.

2. Description of the Prior Art

Generally, video signal coding methods may be classified into a frame-based coding method which encodes the entire rectangular frame or picture and an object-based coding method which encodes only an arbitrary shaped region. The representative examples of the object-based coding method may be standards such as ISO/IEC JTC1/SC29/WG11 MPEG-4, ISO/IEC JTC1/SC29/WG1 JPEG2000, etc.

The object-based coding method using shape information is adapted to extract only specific regions, or objects, desired by the user from the entire image sequence by virtue of a segmentation technique, code the extracted regions and reconstruct the coded regions in a frame in a predetermined order. The shape information is used in the object-based coding method to make a distinction between the extracted objects. For example, the shape information can be used to classify an image into an object region and a non-object region (background). Accordingly, the shape information allows a coder and decoder to effect a signal process based on the object region rather than the entire image. The shape information may be either binary information or gray scale information.

The binary shape information is used to make a distinction between two objects in one image sequence, and the gray scale shape information is used to make a distinction among a plurality of objects in one image sequence. The binary shape information is represented by two values—for example, 0 and 1, or 0 and 255, etc., and the gray scale shape information is represented by any value within a predetermined range—for example, from 0 to 255.

On the other hand, for an application field requiring a high picture quality, such as a TV program broadcast, MPEG-4 supports both progressive and interlaced scan type images, similarly to MPEG-2.

Figure 1A:
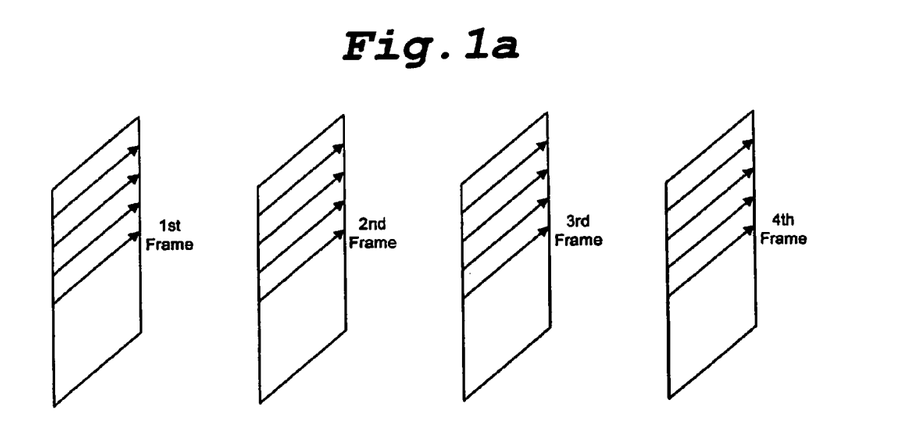
FIG. 1a is a view showing a frame format of a progressive scan type.
Figure 1B:
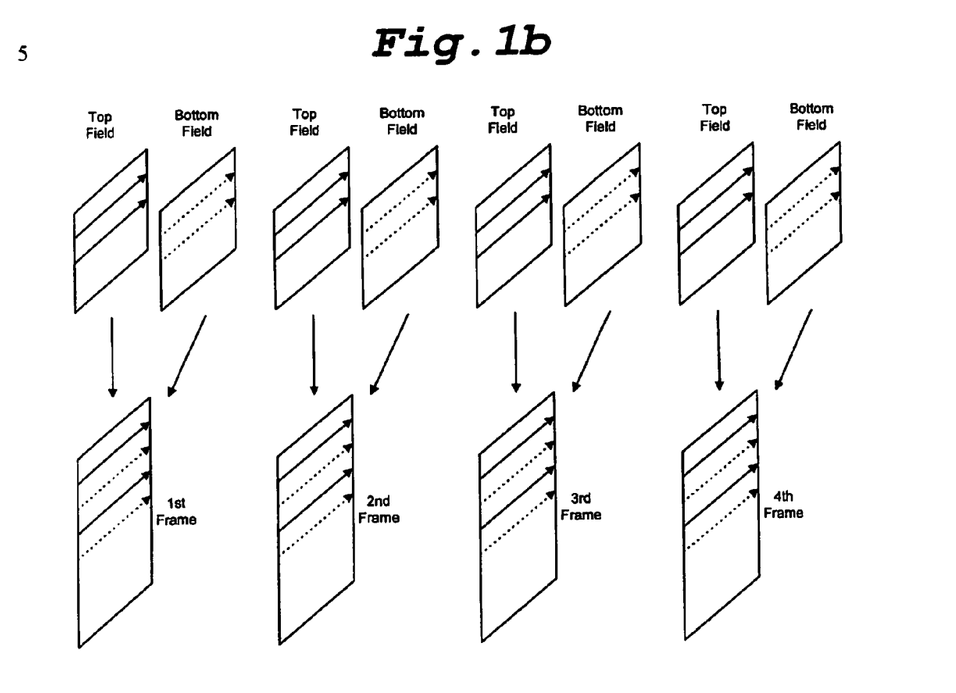
FIG. 1b is a view showing a frame format of an interlaced scan type.

Video scanning methods will hereinafter be described briefly. The video scanning methods may greatly be classified into a progressive scan type as shown in FIG. 1a and an interlaced scan type as shown in FIG. 1b. In the progressive scanning method of FIG. 1a, a one-frame image is composed of lines which are sequentially scanned. However, in the interlaced scanning method of FIG. 1b, a one-frame image is composed of lines which are alternately scanned. Namely, in the interlaced scanning method, a one-frame image consists of two field images sampled at different times, or a top field image and a bottom field image. Such a difference between the frame image and the field images requires that a video signal should be coded in a field unit as well as in a frame unit for the efficient coding of the field images.

When an object-based video process is performed, instead of generating or transmitting chrominance shape information of an object video signal, chrominance shape information is extracted by sub-sampling luminance shape information of the video signal in consideration of a sampling frequency ratio of luminance signal Y to chrominance signals Cb and Cr of chrominance signals. For example, considering the object-based vide codec, only the luminance shape information is inputted and transmitted to indicate a region in a frame and the chrominance shape information is extracted on the basis of the luminance shape information by virtue of an appropriate sub-sampling technique.

Figure 2:
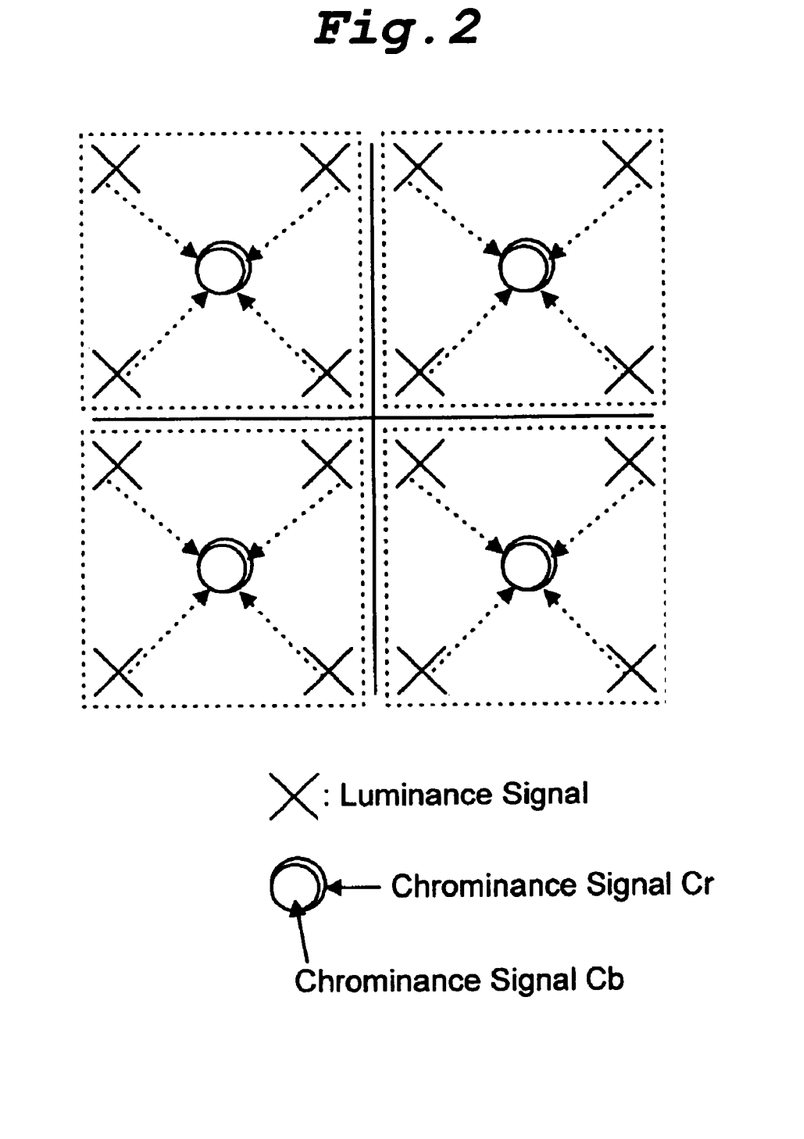
FIG. 2 is a view illustrating a luminance-chrominance relation in a 4:2:0 video format and a conventional conservative chrominance shape sub-sampling method.

A conventional chrominance shape information extraction method will hereinafter be described in more detail. In the most video coding standards, a sampling frequency ratio of luminance signal Y to chrominance signals Cb and Cr is 4:2:0, as shown in FIG. 2. According to a 4:2:0 video format, the total number of chrominance pixels is ¼ that of luminance pixels (because the amount of chrominance data is reduced by ½, respectively, in horizontal and vertical directions).

Figure 3:
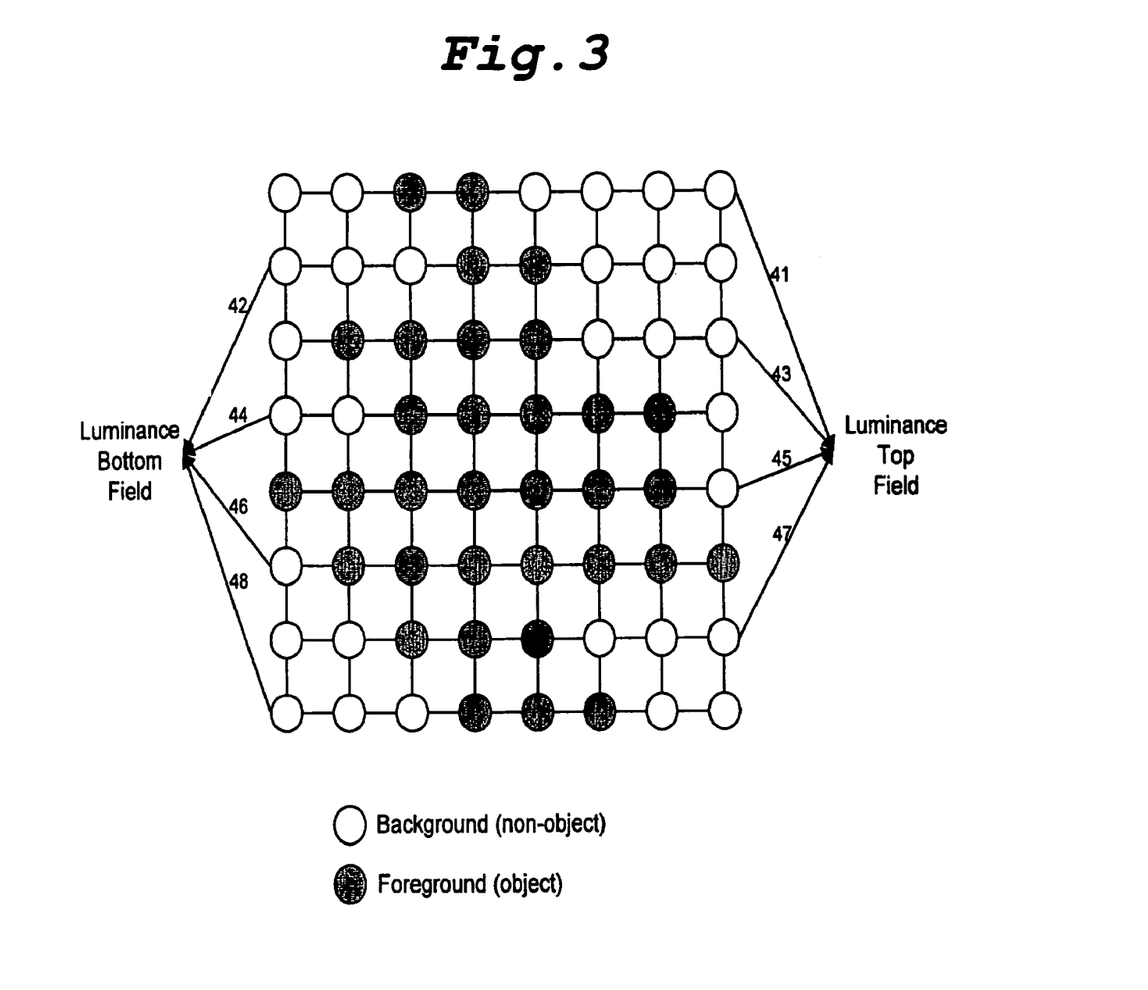
FIG. 3 is a view showing an arrangement of luminance shape information in one block of an interlaced scan type image with arbitrary shape information, where "○" indicates background pixel and "●" indicates object pixel.

In other words, one chrominance component (i.e., Cb or Cr) is present with respect to four luminance components. This luminance-to-chrominance ratio must identically be applied to the extraction of chrominance shape information used in coding the chrominance signals. In the current MPEG-4 video standard, a conservative chrominance shape sub-sampling method is used to extract chrominance shape information as shown in FIG. 4 with respect to luminance shape information as shown in FIG. 3 regardless of a video scanning type.

Figure 4:
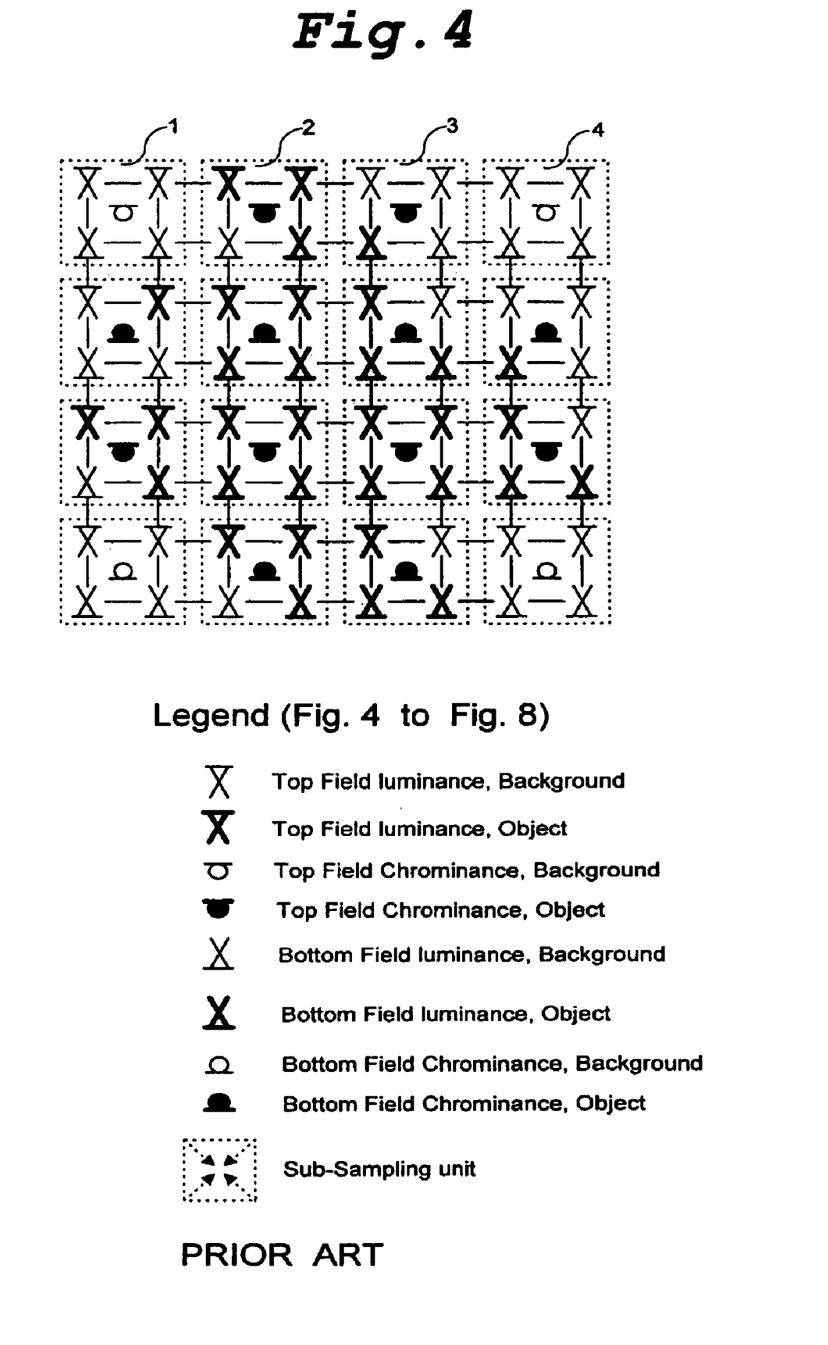
FIG. 4 is a view illustrating a luminance shape information-chrominance shape information relation when chrominance shape information is extracted with respect to the luminance shape information of FIG. 3 by the conventional conservative sub-sampling method.
Figure 5A:
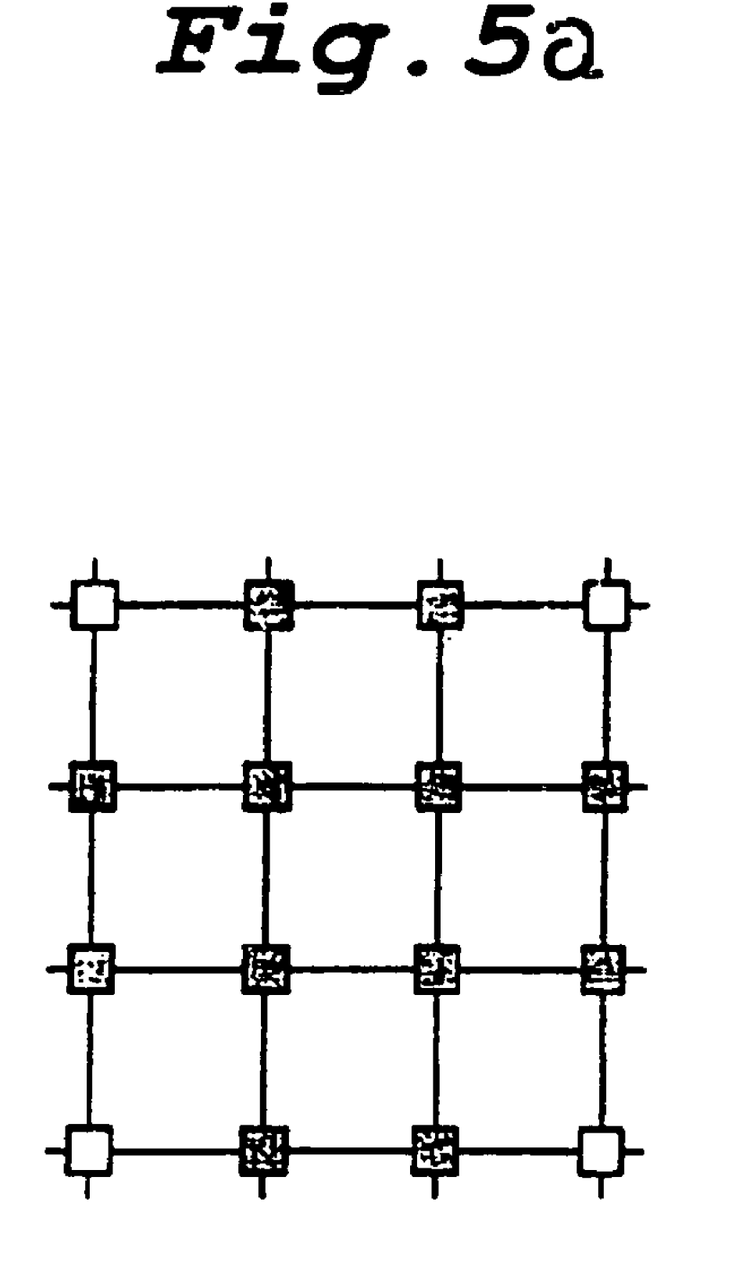
FIG. 5a is a view showing an arrangement of the chrominance shape information extracted with respect to the luminance shape information of FIG. 3 by the conventional conservative sub-sampling method, where "□" indicates background chrominance pixel and "■" indicates object chrominance pixel.
Figure 5B:
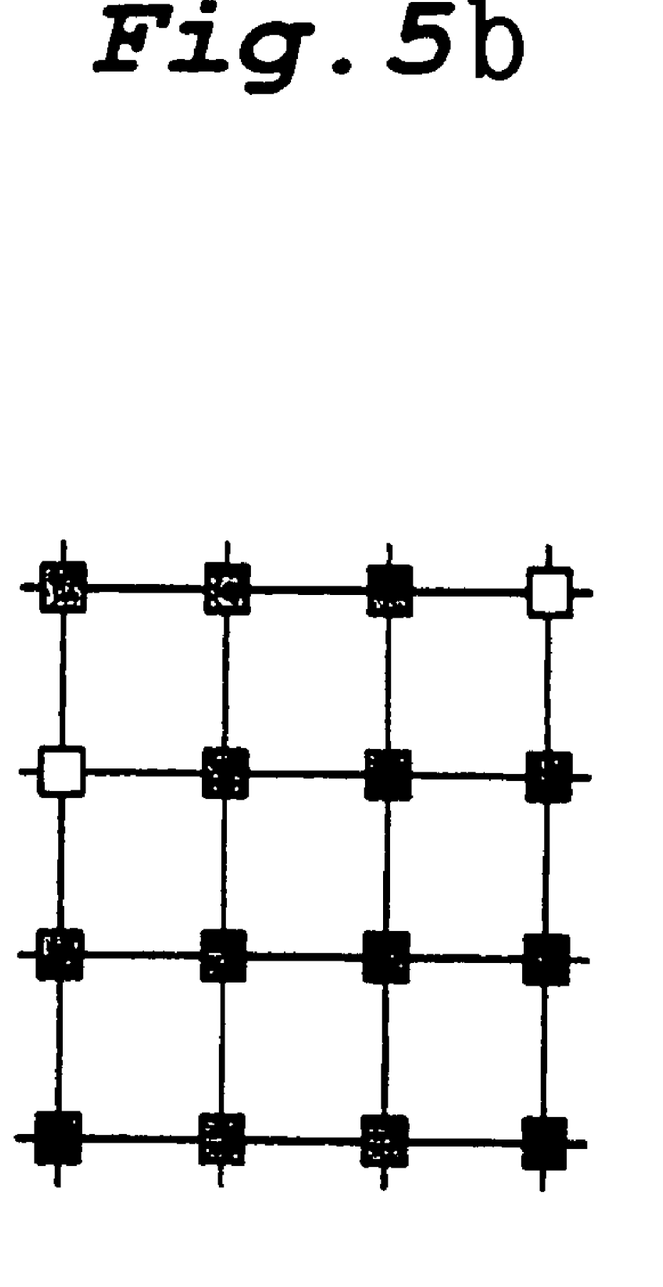
FIG. 5b is a view showing an arrangement of chrominance shape information extracted with respect to the luminance shape information of FIG. 3 by a chrominance shape information extraction method of the present invention, where "□" indicates background chrominance pixel and "■" indicates object chrominance pixel.

In a conventional conservative sub-sampling method, as shown in FIG. 4, four adjacent luminance shape pixels (also designated as alpha pixel) surrounding a chrominance pixel corresponding to chrominance shape information to be extracted and nearest to the chrominance shape pixel are set to a sub-sampling unit. If all of the four luminance shape pixels are background pixels as in sub-sampling units 1 and 4, the corresponding chrominance shape pixel is determined as background shape pixel. In the case where at least one of the four luminance shape pixels is an object pixel as in sub-sampling units 2 and 3, the corresponding chrominance shape pixel is determined as object shape pixel. FIG. 5a shows an arrangement of chrominance shape information extracted with respect to the luminance shape information of FIG. 3 by the conventional conservative sub-sampling method, where "☐" indicates background shape pixel and "■" indicates object shape pixel.

However, if a characteristic of an interlaced scan type image is not considered in the above-mentioned conservative sub-sampling method, a color bleeding phenomenon will occur.

This color bleeding phenomenon appears when any one of a luminance component and a chrominance component corresponding thereto is not present, namely, when no chrominance signal is present whereas a luminance signal is present, and vice versa.

Figure 6:
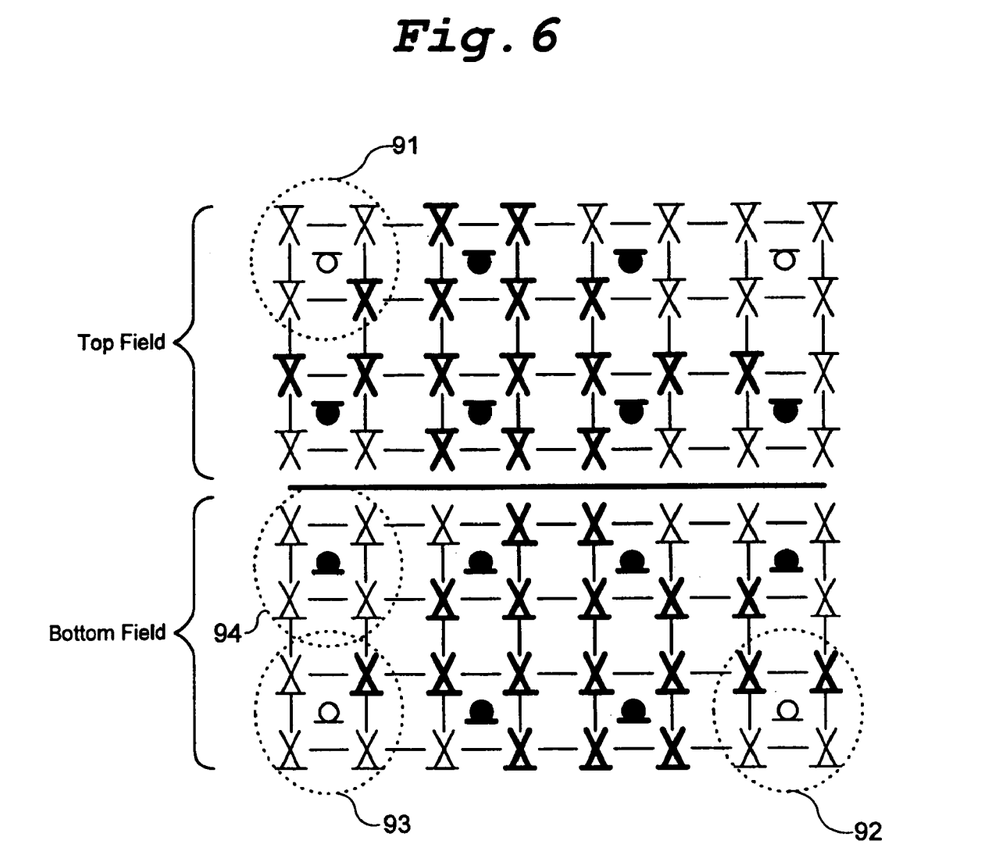
FIG. 6 shows a color bleeding problem when the chrominance shape information of FIG. 5a is extracted with respect to the interlaced scan type image with the luminance shape information of FIG. 3 by the conventional conservative sub-sampling method.

FIG. 6 shows color bleeding portions appearing when the result extracted by the conventional conservative sub-sampling method in FIG. 4 is projected on a screen in an interlaced scanning manner. As shown in this drawing, in the case where the conservative sub-sampling method for the progressive scan type image is applied to an interlaced scan type image, a color bleeding phenomenon occurs in which there are present portions 91, 92 and 93 with luminance components and no chrominance component corresponding thereto and a portion 94 with a chrominance component and no luminance component corresponding thereto.

Such a sampling error of chrominance shape information, in turn, results in the occurrence of an error in extracting the chrominance shape information. As a result, a chrominance signal of a background, not intended to be expressed, may be processed as that of an object. This has no effect on an objective picture quality, but it results in a significant degradation in subjective picture quality because the background signal is shown in the object. The picture quality of a video signal may be estimated in a quantitative manner based on a signal-to-noise ratio (SNR) or in a qualitative manner based on human visual sense. The former is called the objective picture quality and the latter is called the subjective picture quality. The subjective picture quality is estimated qualitatively according to a difference between human visual impressions on image regions in a frame. Hence, the subjective picture quality cannot be estimated in such a quantitative manner as the SNR, but it is as important as the objective picture quality in estimating the performance of video processing techniques or units. In this connection, in the object-based video processing desiring excellent picture quality, a method is keenly required which is capable of extracting accurate chrominance shape information.

SUMMARY OF THE INVENTION

Therefore, the present invention has been made in view of the above problem, and it is an object of the present invention to provide a method of accurately extracting chrominance shape information for an interlaced scan type image, in which the chrominance shape information is sub-sampled in consideration of a characteristic of the interlaced scan type image.

It is another object of the present invention to provide an apparatus for extracting chrominance shape information for an interlaced scan type image, which is capable of implementing the above-mentioned chrominance shape information extraction method.

In accordance with one aspect of the present invention, there is provided a method of extracting chrominance shape information for an interlaced scan type image, comprising the step of setting, to one sub-sampling unit, every four adjacent luminance shape pixels in two lines of the same type field of an interlaced scan type image signal, and extracting the chrominance shape information on the basis of the four adjacent luminance shape pixels in each of the sub-sampling units.

In accordance with another aspect of the present invention, there is provided an apparatus for extracting chrominance shape information for an interlaced scan type image, comprising a field separator for separating input luminance shape information into top and bottom fields; a top field sub-sampler for extracting chrominance shape information on the basis of luminance shape pixels in two lines of top field; a bottom field sub-sampler for extracting chrominance shape information on the basis of luminance shape pixels in two lines of bottom field; and frame reconstruction means for reconstructing the chrominance shape of a frame based on the chrominance shape information extracted by the top and bottom field sub-samplers.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

FIG. 3 shows an example of arrangement of luminance shape information in one block (8 pixels/line×8 lines) of an interlaced scan type image with arbitrary shape information. As shown in this drawing, in an interlaced scanning method, a one-frame image consists of two field images sampled at different times, or a top field image and a bottom field image. In order to solve a conventional color bleeding problem in extracting chrominance shape information on the basis of luminance shape information, a chrominance shape information extraction method of the present invention does not employ a conventional conservative sub-sampling method but a new sub-sampling method of performing a sub-sampling operation using two lines of the same type field.

That is, in the interlaced scan type image with the arbitrary luminance shape information as shown in FIG. 3, chrominance shape information is extracted on the basis of four adjacent luminance shape pixels in two lines of the same type field by the chrominance shape information extraction method of the present invention. The chrominance shape information extraction method of the present invention is used in the current MPEG-4 video standard.

Figure 9:
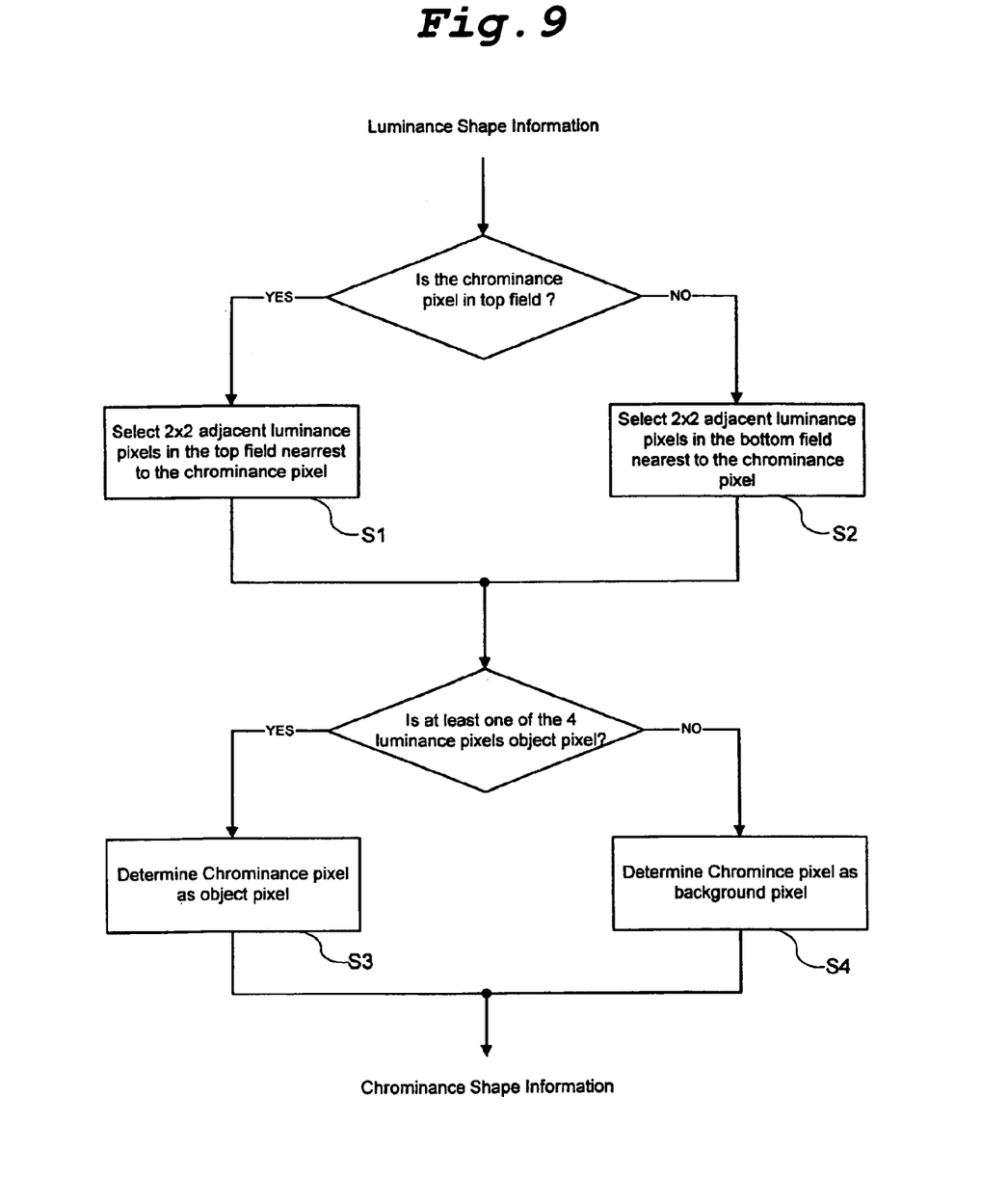
FIG. 9 is a flowchart illustrating the chrominance shape information extraction method of the present invention.

FIG. 9 is a flowchart illustrating the chrominance shape information extraction method of the present invention. As shown in this drawing, it is first checked whether a desired chrominance pixel corresponding to chrominance shape information to be extracted belongs to the top field or bottom field. If the desired chrominance shape pixel belongs to the top field, four (2 pixels/line×2 lines or 2×2) adjacent luminance shape pixels in the top field nearest thereto, are set to one sub-sampling unit at step S1. To the contrary, in the case where the desired chrominance shape pixel belongs to the bottom field, four (2×2) adjacent luminance shape pixels in the bottom field nearest thereto, are set to one sub-sampling unit at step S2. Then, if at least one of the four adjacent luminance shape pixels in each sub-sampling unit is an object pixel, the desired chrominance shape pixel is determined as an object pixel at step S3. However, in the case where all of the four adjacent luminance shape pixels in each sub-sampling unit are background pixels, the desired chrominance shape pixel is determined as a background pixel at step S4. The chrominance shape information, extracted from the luminance shape information in this manner, may be defined in the form of a matrix based on various logic values, each of which indicates whether the corresponding chrominance shape pixel is an object pixel or a background pixel. In this case, the object shape information may be represented by either a binary value 1 or a gray scale value greater than 0, which indicates actual video data to be coded by a coder.

Alternatively, according to the present invention, the sum or average of logic values of the four adjacent luminance shape pixels in each sub-sampling unit may be used for the extraction of chrominance shape information. In this case, the sum or average of logic values is compared with a predetermined threshold value. The chrominance shape information is determined as object shape information if the sum or average exceeds the threshold value and as background shape information if not so. The threshold value may be either a binary value 0 or a gray scale value selected according to a user's intention.

Figure 7A:
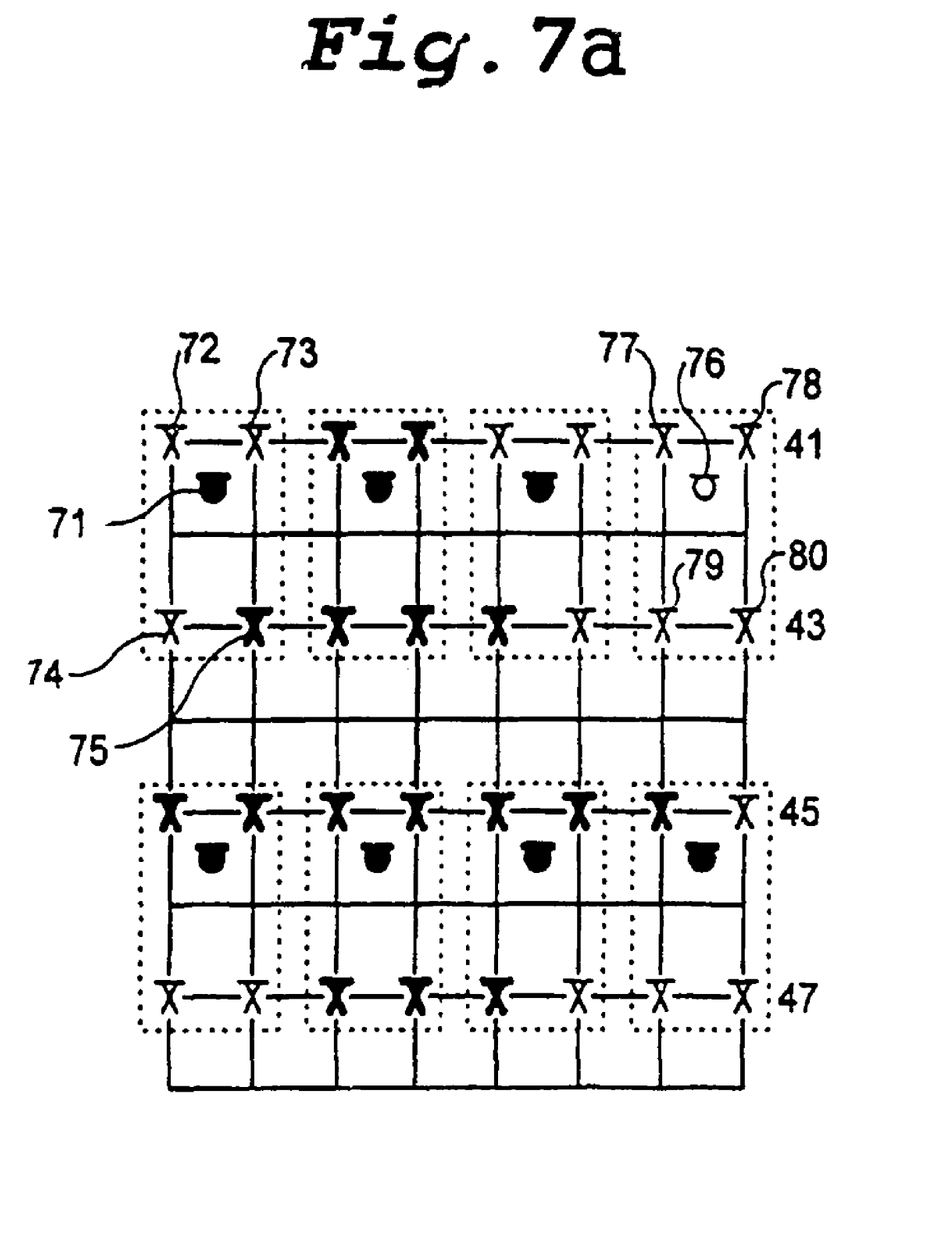
FIGS. 7a and 7b illustrate a luminance-chrominance shape information relation of top field and bottom field, respectively, when the chrominance shape information of FIG. 5b is extracted with respect to the luminance shape information of FIG. 3 by the chrominance shape information extraction method of the present invention.
Figure 7B:
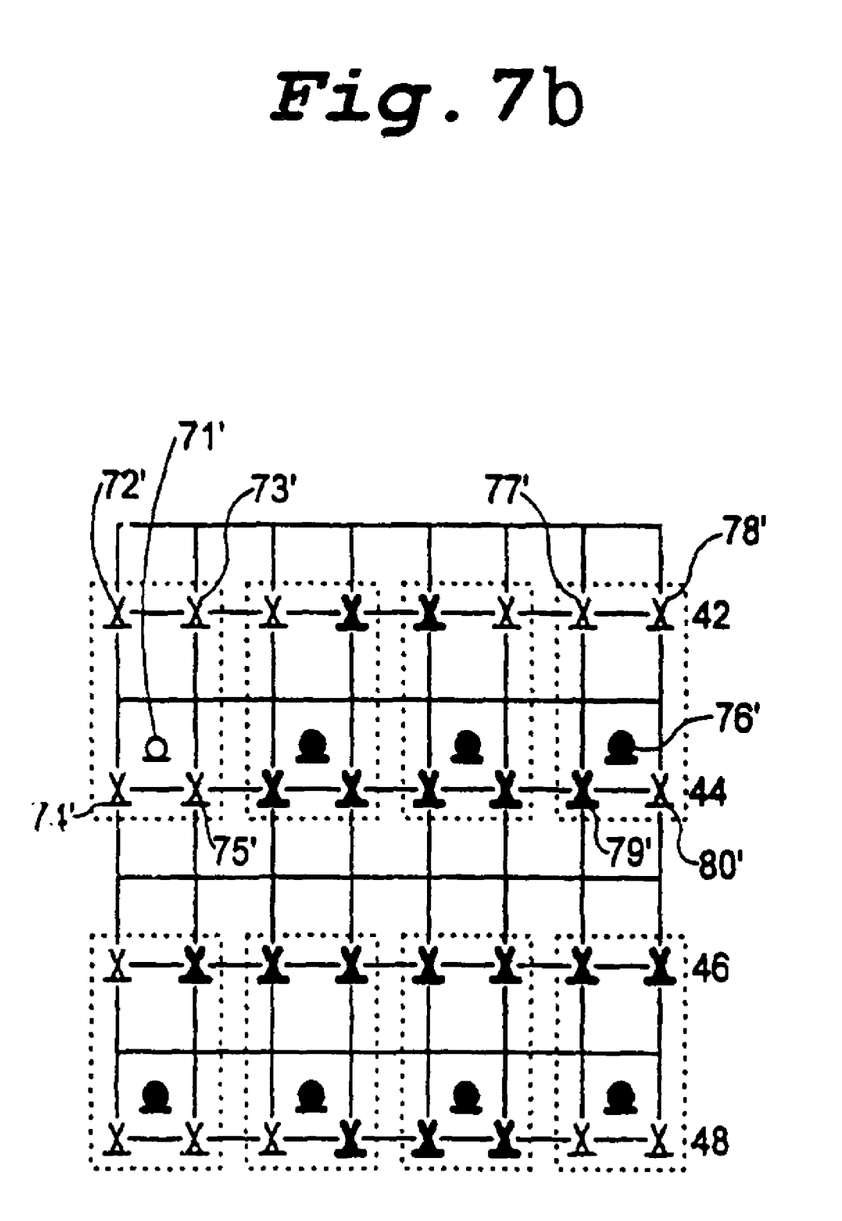

FIGS. 7a and 7b illustrate a luminance-chrominance shape information relation when chrominance shape information is extracted with respect to the luminance shape information of FIG. 3 by the chrominance shape information extraction method of the present invention.

According to the present invention, in the interlaced scan type image consisting of the two fields with the arbitrary luminance shape information shown in FIG. 3, chrominance shape information is extracted on the basis of four luminance shape pixels in each sub-sampling unit.

If a chrominance pixel corresponding to chrominance shape information to be extracted is present in the top field, four adjacent luminance shape pixels in the top field, nearest thereto, are used to extract the chrominance shape information. If at least one of the four luminance shape pixels is an object pixel, the chrominance shape pixel is determined as object pixel.

For example, in FIG. 7a, if a chrominance shape pixel 71 corresponding to chrominance shape information to be extracted is present in the top field, four (2×2) adjacent luminance shape pixels 72, 73, 74 and 75 on the first and the second lines 41 and 43 out of pixel lines 41, 43, 45 and 47 in the top field, surrounding the chrominance shape pixel 71 and nearest thereto, are set to a sub-sampling unit. Because one 75 of the four luminance shape pixels 72-75 in the sub-sampling unit is an object pixel, the chrominance shape pixel 71 is determined as an object pixel. As a result, object shape information is extracted as the chrominance shape information. Then, chrominance shape information of the next chrominance shape pixel is extracted in the same manner.

Figure 8:
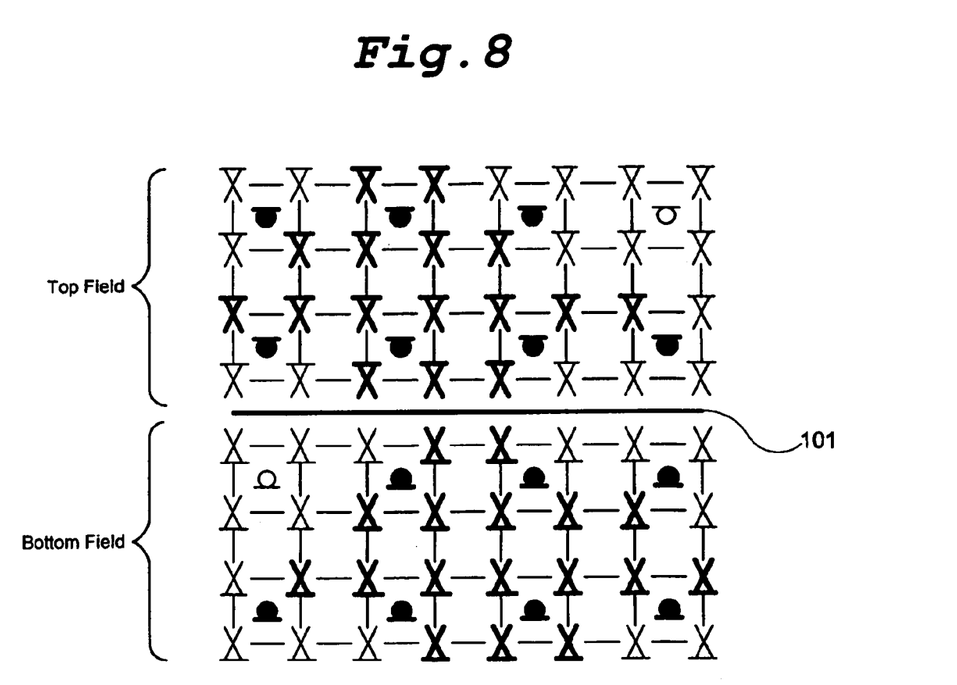
FIG. 8 shows an arrangement of luminance and chrominance shape pixels when the chrominance shape information of FIG. 5b is extracted with respect to the interlaced scan type image with the luminance shape information of FIG. 3 by the chrominance shape information extraction method of the present invention.

In case of a chrominance shape pixel 76 in FIG. 7a, four adjacent luminance shape pixels 77, 78, 79 and 80 on the first and the second lines 41 and 43 in the top field, surrounding the chrominance shape pixel 76 and nearest thereto, are set to a sub-sampling unit. Because all of the four luminance shape pixels 77-80 in the sub-sampling unit are background pixels, the chrominance shape pixel 76 is determined as a background pixel. As a result, background shape information is extracted as the chrominance shape information. Then, chrominance shape information of the next chrominance shape information pixel is extracted in the same manner. FIG. 8 shows an arrangement of luminance and chrominance shape information pixels based on scanning time when chrominance shape information is extracted with respect to the interlaced scan type image with the luminance shape information of FIG. 3 by the chrominance shape information extraction method of the present invention. In this drawing, the top field in which the extracted chrominance shape information and the luminance shape information are arranged is shown above a center partition line 101.

On the other hand, in FIG. 7b, if a chrominance shape pixel 71' corresponding to chrominance shape information to be extracted is present in the bottom field, four adjacent luminance shape pixels 72', 73', 74' and 75' on the first and the second lines 42 and 44 out of pixel lines 42, 44, 46 and 48 in the bottom field, surrounding the chrominance shape pixel 71' and nearest thereto, are set to a sub-sampling unit. Because all of the four luminance shape pixels 72'-75' in the sub-sampling unit are background pixels, the chrominance shape pixel 71' is determined as a background pixel. As a result, background shape information is extracted as the chrominance shape information. Then, chrominance shape information of the next chrominance shape pixel is extracted in the same manner.

In FIG. 7b, if a chrominance shape pixel 76' corresponding to chrominance shape information to be extracted is present in the bottom field, four adjacent luminance shape pixels 77', 78', 79' and 80' on the first and the second lines 42 and 44 in the bottom field, surrounding the chrominance shape pixel 76' and nearest thereto, are set to a sub-sampling unit. Because one 79' of the four luminance shape pixels 77'-80' in the sub-sampling unit is an object pixel, the chrominance shape pixel 76' is determined as an object pixel. As a result, object shape information is extracted as the chrominance shape information. Then, chrominance shape information of the next chrominance shape pixel is extracted in the same manner. In FIG. 8, the bottom field in which the extracted chrominance shape information and the luminance shape information are arranged is shown below the center partition line 101.

In an embodiment of the present invention, an apparatus for extracting chrominance shape information for an interlaced scan type image comprises sub-sampling means for extracting the chrominance shape information on the basis, of four adjacent luminance shape pixels in two lines of the same type field of an interlaced scanned video signal. In an alternative embodiment of the present invention, an apparatus for extracting chrominance shape information for an interlaced scan type image comprises means for setting, to one sub-sampling unit, every four adjacent luminance shape pixels in two lines of the same type field of an interlaced scan type image signal, and sub-sampling means for extracting chrominance shape information corresponding to an object, if at least one of the four luminance shape pixels in each of the sub-sampling units is an object pixel.

The chrominance shape information extraction method and apparatus of the present invention is used in an MPEG-4 video compression coder and decoder for the object-based process. Further, the present method and apparatus are applicable to a content creation field where the user extracts and manipulates a desired region (object) in the entire image.

Now, the object-based image signal coding and decoding systems to which the present invention is applicable will be described in detail.

Figure 10:
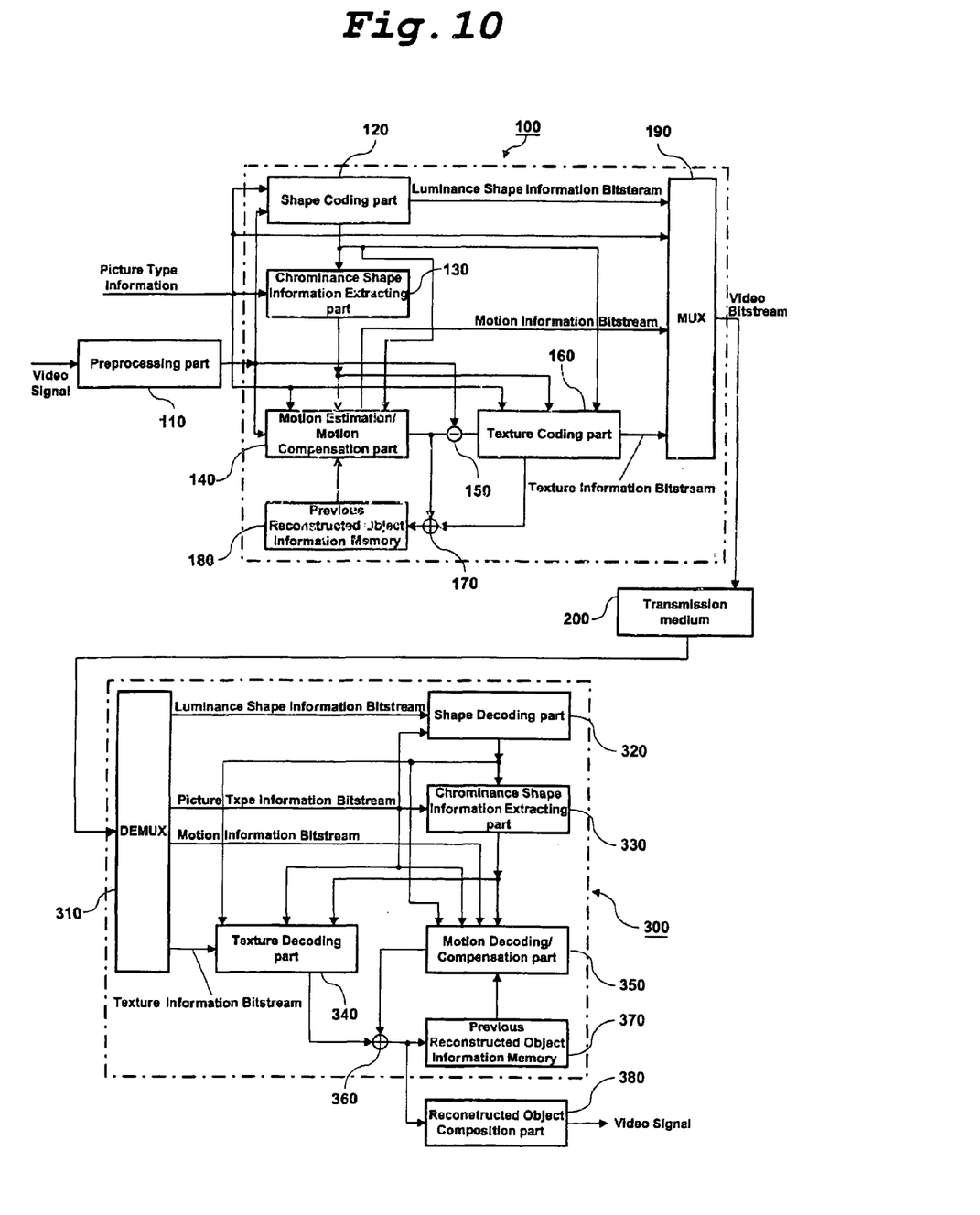
FIG. 10 is a block diagram showing an embodiment of a video compression coder/decoder system to which the chrominance shape information extraction method of the present invention is applied.

FIG. 10 shows an embodiment of an object-based video compression coder/decoder system to which the chrominance shape information extraction method of the present invention is applied. As shown in this drawing, the coder/decoder system comprises a coder 100 including a preprocessor 110, shape coding part 120, chrominance shape information extracting part 130, motion estimation/compensation part 140, texture coding part 160, subtracter 150, adder 170, previous reconstructed object information memory 180 and multiplexer (MUX) 190; a transmission medium 200; and a decoding part 300 including shape decoding part 320, chrominance shape information extracting part 330, motion decoding/motion compensation part 350, texture decoding part 340, adder 360, previous reconstructed object information memory 370, demultiplexer (DEMUX) 310 and reconstructed object composition part 380.

In an object-based video compression coding operation, the preprocessor 110 segments an input video signal into individual objects and represents the segmented object using its shape information and texture information, which are then applied to the shape coding part 120 and motion estimation/compensation part 140, respectively. The shape coding part 120 encodes the shape information of each object from the preprocessor 110 and generates reconstructed shape information. The reconstructed luminance shape information from the shape coding part 120 is transmitted to the chrominance shape information extracting part 130, motion estimation/compensation part 140 and texture coding part 160, thereby allowing them to perform their operations in the unit of objects. Another output from the shape coding part 120, or a luminance shape information bitstream, is applied to the multiplexer 190.

The chrominance shape information extracting part 130 also receives picture type information. This information indicates whether the input video signal is generated by progressive scan type or interlaced scan type. If a given picture has a frame format of the progressive scan type, the chrominance shape information extracting part 130 performs a conventional conservative chrominance shape sub-sampling operation with respect to the luminance shape information from the shape coding part 120. However, in the case where the given picture has a field format of the interlaced scan type, the chrominance shape information extracting part 130 performs the chrominance shape information extraction method of the present invention with respect to the luminance shape information from the shape coding part 120.

Figure 11:
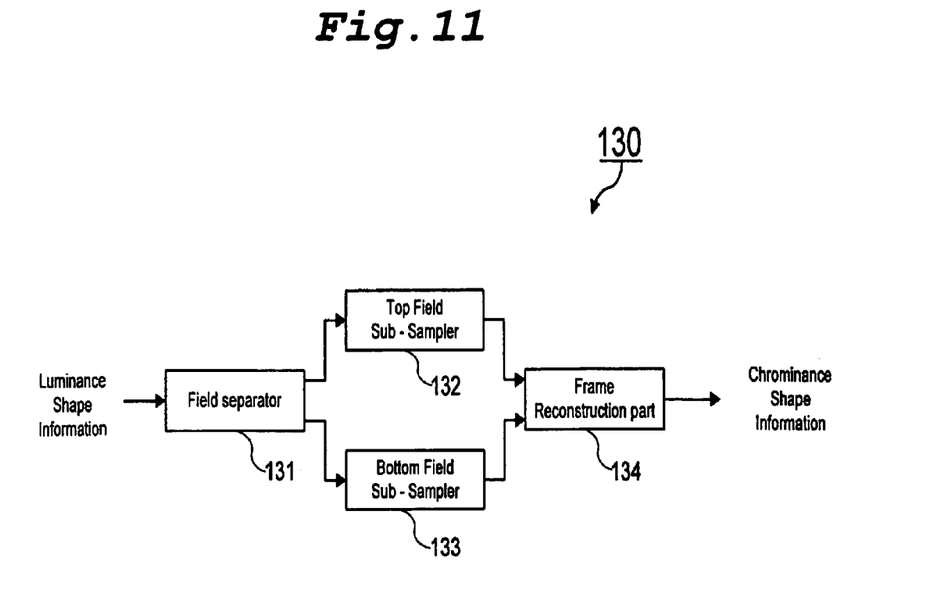
FIG. 11 is a block diagram showing an embodiment of a chrominance shape information extraction apparatus of the present invention.

A detailed construction of the chrominance shape information extracting part 130 for the interlaced scan type image is shown in block diagram in FIG. 11. As shown in this drawing, the chrominance shape information extracting part 130 comprises a field separator 131 for separating the luminance shape information from the shape coding part 120 into top and bottom fields, a top field sub-sampler 132 for setting every four adjacent luminance shape pixels in two lines of top field to one sub-sampling unit and extracting chrominance shape information corresponding to an object, if at least one of the four luminance shape pixels in each of the sub-sampling units is an object pixel, a bottom field sub-sampler 133 for setting every four adjacent luminance shape pixels in two lines of bottom field to one sub-sampling unit and extracting chrominance shape information corresponding to an object, if at least one of the four luminance shape pixels in each of the sub-sampling units is an object pixel, and a frame reconstruction part 134 for reconstructing the chrominance shape of a frame based on the chrominance shape information extracted by the top and the bottom field sub-samplers 132 and 133. Each of the top and the bottom field sub-samplers 132 and 133 includes means for setting every four adjacent luminance shape pixels in two lines of the same type field to one sub-sampling unit, and sub-sampling means for extracting chrominance shape information corresponding to an object, if at least one of the four luminance shape pixels in each of the sub-sampling units is an object pixel.

A motion estimation unit in the motion estimation/compensation part 140 estimates motion information of the current object texture information by comparing texture information of the current object based on the shape information from the shape coding part 120 with texture information of the previous object stored in the previous reconstructed object information memory 180. The motion information estimated by the motion estimation unit is fed to a motion compensation unit in the motion estimation/compensation part 140 for motion compensated prediction. Further, the estimated motion information is efficiently encoded in the motion estimation/compensation part 140 and then transmitted to the multiplexer 190 in the form of a motion information bitstream. The motion compensation unit performs a motion compensated prediction operation on the basis of the motion information estimated by the motion estimation unit and the previous object texture information from the previous reconstructed object information memory 180.

The subtracter 150 obtains a prediction error, or a difference between input texture information of the current object to be coded and motion compensated prediction texture information from the motion compensation unit. The prediction error obtained by the subtracter 150 is encoded by the texture coding part 160 which then transmits a texture information bitstream to the multiplexer 190. The texture coding part 160 also supplies a reconstructed prediction error signal to the adder 170 which adds it to a motion compensated prediction signal from the motion compensation unit to produce reconstructed texture information of the corresponding object.

The reconstructed texture information from the adder 170 is stored in the previous reconstructed object information memory 180 so that it can be used for the coding of the subsequent input object. The multiplexer 190 multiplexes the luminance shape information bitstream from the shape coding part 120, motion information bitstream from the motion estimation/compensation part 140 and texture information bitstream from the texture coding part 160 and then transmits the resultant video bitstream to the decoding part 300 via the transmission medium 200.

On the other hand, in the decoding part 300, the demultiplexer 310 separates the video bitstream transmitted via the transmission medium 200 into the motion information bitstream, luminance shape information bitstream, texture information bitstream and picture type information bitstream.

The shape decoding part 320 receives the luminance shape information bitstream from the demultiplexer 310 and provides reconstructed shape information to the chrominance shape information extracting part 330, motion compensation part 350 and texture decoding part 340 for the object-based decoding process. It should be noted herein that only luminance shape information is transmitted via the transmission medium 200.

In this connection, the chrominance shape information extracting part 330 extracts chrominance shape information on the basis of the transmitted luminance shape information. The chrominance shape information extracting part 330 is substantially the same in construction and operation as the chrominance shape information extracting part 130 in the coder 100. The chrominance shape information extracted by the chrominance shape information extracting part 330 is inputted to the texture decoding part 340 and motion decoding/compensation part 350. The texture decoding part 340 decodes the texture information bitstream using the reconstructed shape information from the shape decoding part 320 to provide reconstructed texture information. The motion decoding unit of motion decoding/compensation part 350 decodes motion information from the motion information bitstream. And the motion compensation unit of motion decoding/compensation part 350 performs a motion compensated prediction operation on the basis of motion information from a motion decoding part and previous texture information stored in the previous reconstructed object information memory 370. Even in this case, the reconstructed shape information from the shape decoding part 320 is, of course, applied to the motion compensation part 350 because the motion compensated prediction operation must be performed in the unit of objects.

The adder 360 adds a motion compensated prediction signal from the motion compensation part 350 to the reconstructed texture information from the texture decoding part 340 to reconstruct the corresponding object. This reconstructed object is stored in the previous reconstructed object information memory 370 so that it can be used for the coding of the subsequent frames. The reconstructed object from the adder 360 is also combined with other objects by the reconstructed object composition part 380 for the reproduction of a video signal.

As apparent from the above description, according to the present invention, the chrominance shape information extraction method and apparatus are adapted to set, to one sub-sampling unit, every four adjacent luminance shape pixels in two lines of the same type field of an interlaced scan type image signal of field format and extract chrominance shape information on the basis of the four luminance shape pixels in each of the sub-sampling units. Therefore, the present invention overcomes a color bleeding problem in a conventional chrominance shape information extraction method considering no characteristic of an interlaced scan type image. As a result, the present invention has the effect of significantly improving a subjective picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for extracting chrominance shape pixels from luminance shape pixels for an interlaced video having two fields, comprising the steps of:
   a) setting every four adjacent luminance shape pixels in two consecutive scan lines within a first field of the interlaced video to a first sub-sampling unit of a video coder; and
   b) extracting an associated chrominance shape pixel on the basis of said four adjacent luminance shape pixels in the first sub-sampling unit.

2. The method as set forth in claim 1, further comprising the step of extracting said associated chrominance shape pixel corresponding to a background, if none of said four adjacent luminance shape pixels in each of said sub-sampling units is an object pixel.

3. A method for extracting chrominance shape pixels from luminance shape pixels for an interlaced video having two fields, comprising the steps of:
   a) setting every four adjacent luminance shape pixels in two consecutive scan lines within a first field of the interlaced video to a first sub-sampling unit of a video coder; and
   b) extracting an associated chrominance shape pixel on the basis of said four adjacent luminance shape pixels if at least one of said four luminance shape pixels in the first sub-sampling unit is an object pixel.

4. The method as set forth in claim 3, further comprising the step of extracting said associated chrominance shape pixel corresponding to a background, if none of said four adjacent luminance shape pixels in said sub-sampling units is an object pixel.

5. The method as set forth in claim 3, wherein said two fields are top and bottom fields; and wherein said step (b) includes:
   the step of, if said associated chrominance shape pixel to be extracted is present in said top field, extracting said associated chrominance shape pixel on the basis of four adjacent luminance shape pixels in said top field.

6. The method as set forth in claim 3, wherein said two fields are top and bottom fields and wherein said step (b) includes:
   the step of, if said associated chrominance pixel to be extracted is present in said bottom field, extracting said associated chrominance shape pixel on the basis of four adjacent luminance shape pixels in said bottom field.

7. The method as set forth in claim 3, wherein said two fields are top and bottom fields.

8. The method as set forth in claim 3, wherein
   said two fields are top and bottom fields; and wherein said step (b) includes:
   the step of, if said associated chrominance shape pixel to be extracted is present in said top field, extracting said associated chrominance shape pixel on the basis of four adjacent luminance shape pixels in said top field; and
   wherein said step (b) includes:
   the step of, if said associated chrominance shape pixel to be extracted is present in said bottom field, extracting said associated chrominance shape pixel on the basis of four adjacent luminance shape pixels in said bottom field.

9. An apparatus for extracting chrominance shape from luminance shape for an interlaced video, comprising:
   a field separator for separating a frame based luminance shape into a top field luminance shape and a bottom field luminance shape;
   top field sub-samplers for extracting first chrominance shape from said top field luminance shape on the basis of four adjacent luminance shape pixels in two consecutive lines of said top field;
   bottom field sub-samplers for extracting second chrominance shape from said bottom field luminance shape on the basis of four adjacent luminance shape pixels in two consecutive lines of said bottom field; and frame reconstruction means for reconstructing the chrominance shape by interleaving said first chrominance shape with said second chrominance shape line by line.

10. The apparatus as set forth in claim 9, wherein said top field sub-samplers set every four adjacent luminance shape pixels in two consecutive lines of said top field as a sub-sampling unit and extract an associated chrominance shape pixel corresponding to an object, if at least one of said four luminance shape pixels in each of said sub-sampling units is an object pixel; and said bottom field sub-samplers set every four adjacent luminance shape pixels in two consecutive lines of said bottom field as a sub-sampling unit and extract an associated chrominance shape pixel corresponding to an object, if at least one of said four luminance shape pixels in each of said sub-sampling units is an object pixel.

11. The apparatus as set forth in claim 9, wherein said top field sub-samplers set every four adjacent luminance shape pixels in two consecutive lines of said top field as a sub-sampling unit and extract an associated chrominance shape pixel corresponding to a background, if none of said four luminance shape pixels in each of said sub-sampling units is an object pixel.

12. The apparatus as set forth in claim 9, wherein said bottom field sub-samplers set every four adjacent luminance shape pixels in two consecutive lines of said bottom field as a sub-sampling unit and extract an associated chrominance shape pixel corresponding to a background, if none of said four luminance shape pixels in each of said sub-sampling units is an object pixel.

\* \* \* \* \*